(12) United States Patent
Chu et al.

(10) Patent No.: US 8,014,346 B2
(45) Date of Patent: Sep. 6, 2011

(54) METHOD FOR ENABLING PERIODIC SCANNING IN WIRELESS COMMUNICATION NETWORKS

(75) Inventors: Yuechun Chu, Winter Springs, FL (US); Shyamal Ramachandran, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 854 days.

(21) Appl. No.: 12/042,492

(22) Filed: Mar. 5, 2008

(65) Prior Publication Data

US 2009/0225742 A1 Sep. 10, 2009

(51) Int. Cl.
*H04W 4/00* (2009.01)
*H04J 3/24* (2006.01)
*H04L 12/413* (2006.01)

(52) U.S. Cl. ......... 370/328; 370/338; 370/349; 370/445
(58) Field of Classification Search .................. None
See application file for complete search history.

(56) References Cited

U.S. PATENT DOCUMENTS

| 7,885,220 | B2 * | 2/2011 | Kaidar | 370/321 |
| 2004/0132411 | A1 | 7/2004 | Li | |
| 2005/0111415 | A1 | 5/2005 | Soomro et al. | |
| 2006/0171304 | A1 | 8/2006 | Hill et al. | |
| 2006/0281479 | A1 * | 12/2006 | Lee et al. | 455/515 |
| 2007/0064670 | A1 * | 3/2007 | Lee et al. | 370/349 |
| 2007/0070960 | A1 | 3/2007 | Barak et al. | |
| 2008/0096542 | A1 * | 4/2008 | Chu et al. | 455/422.1 |
| 2008/0096581 | A1 * | 4/2008 | Do et al. | 455/456.2 |
| 2009/0046673 | A1 * | 2/2009 | Kaidar | 370/337 |
| 2009/0103474 | A1 * | 4/2009 | Lu et al. | 370/328 |
| 2009/0219909 | A1 * | 9/2009 | Ko et al. | 370/343 |
| 2009/0285167 | A1 * | 11/2009 | Hirsch et al. | 370/329 |
| 2009/0303930 | A1 * | 12/2009 | Ashley | 370/328 |

FOREIGN PATENT DOCUMENTS

| EP | 2028892 A | 2/2009 |
| WO | 02093839 A | 11/2002 |

OTHER PUBLICATIONS

PCT International Search Report with Written Opinion—Application No. PCT/US/2009/035733, mailed Apr. 6, 2009—16 pages.
PCT International Search Report with Written Opinion—Application No. PCT/US2009/035733 mailed Apr. 6, 2009—16 pages.

* cited by examiner

*Primary Examiner* — Steven H Nguyen
(74) *Attorney, Agent, or Firm* — Randi L. Karpinia

(57) ABSTRACT

A method is provided for enabling periodic scanning in a mesh network. The method includes transmitting from a first access point an announcement that it will be temporarily unavailable, wherein the announcement includes: a first information element for quieting a station associated with the access point during a time period; and a second information element for instructing a neighboring access point to temporarily suspend transmissions to the access point during the time period that the stations are quieted.

7 Claims, 5 Drawing Sheets

US 8,014,346 B2

METHOD FOR ENABLING PERIODIC SCANNING IN WIRELESS COMMUNICATION NETWORKS

FIELD OF THE DISCLOSURE

The present disclosure relates generally to wireless communication networks and more particularly to scanning in multi-frequency, multi-hop wireless communication networks.

BACKGROUND

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul.

A mesh network therefore typically comprises one or more IAPs (Intelligent Access Points), and a number of APs (Access Points), which provide data service to STAs (subscriber stations). An AP can connect to IAP directly or through multi-hop route. Different mesh networks can operate in different channels and such channel selections are dynamically changeable. Hence, when a device travels at high speed (e.g. vehicular speed) or in a dense network area, it may need frequent handoff (i.e. transition from one mesh network to another). During the handoff, a device may scan a number of channels before determining a suitable channel and IAP to associate with. The scanning process can take as long as several seconds which can cause serious service or losing connectivity. One way to reduce the scan delay is to operate the access point to perform periodic scanning so that the scan results can be provided to a mobile device to assist in the handoff.

Accordingly, there is a need for a method and apparatus for enabling periodic scanning in wireless communication networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
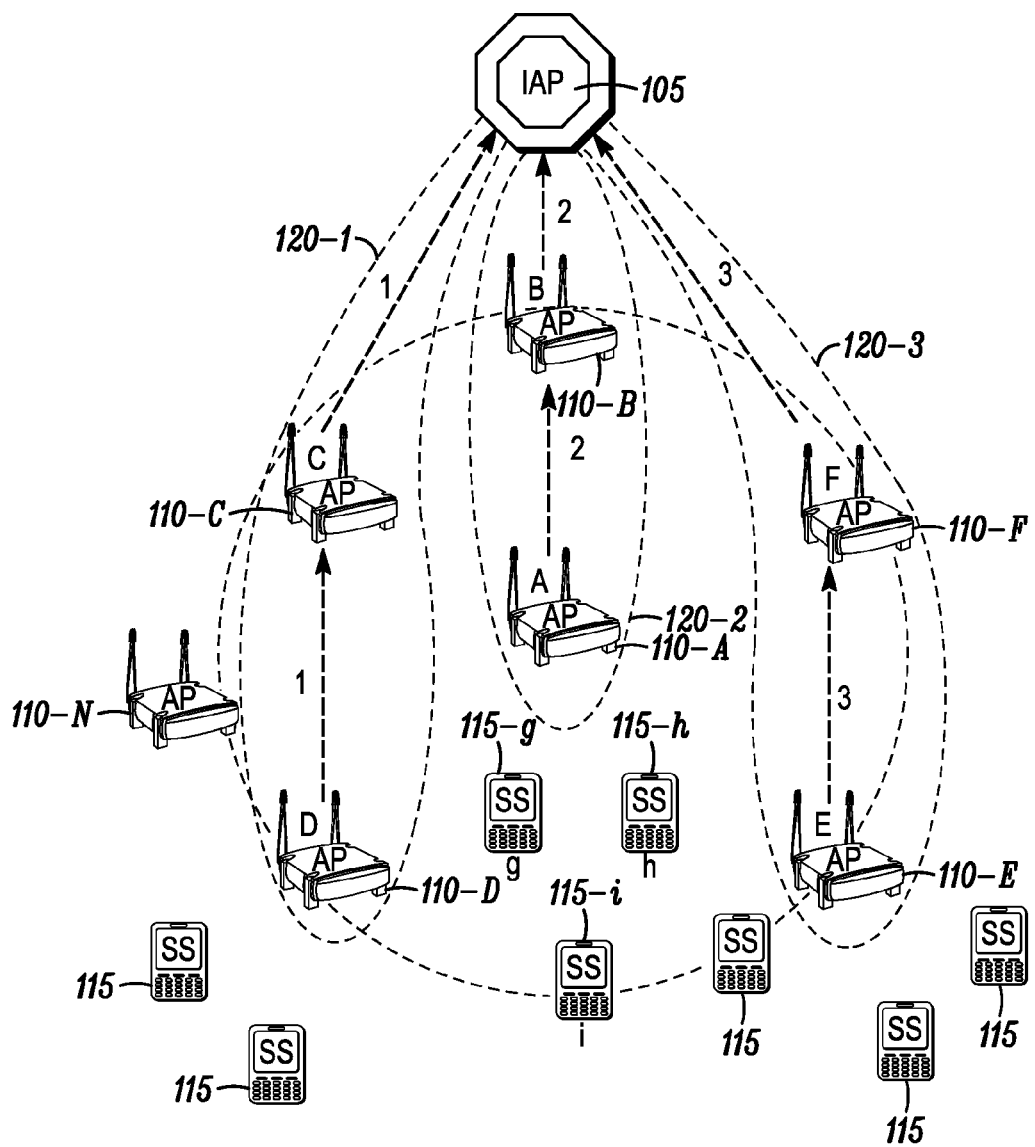
FIG. 1 is a block diagram of an example communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

It will be appreciated by those of ordinary skill in the art that because scanning a non-operating channel requires an AP to take time off from the current channel, it might cause service interruption. To reduce service interruption, instead of listening for an entire beacon period as in normal scanning process, the periodic scanning allows the access point to listens for a small time window at a time. Thus, multiple windows are needed to cover a beacon period. Each access point periodically schedules scanning and provide scan results to mobile device during the handoff (i.e. transition from one access point to another).

The present invention provides for a policy that is executed by the neighbor APs of the scanning AP; and a message exchange among APs; so that the periodic scanning can be employed in mesh networks.

Since in addition to providing data service to local stations (STAs) (i.e. 802.11 stations), a mesh AP (i.e. access point) often needs to forward traffic for other APs, the traffic load on a mesh node might always be high. Instead of waiting until the traffic load becomes low, a mesh AP may schedule periodic scanning based on its own timing. Hence, it is possible for an AP to announce scheduled periodic scanning period in beacons.

The present invention utilizes the existing Quiet element (defined in IEEE 802.11h standard) to announce a scanning period. The Quiet element (or quiet channel element) defines an interval during which no transmission shall occur on the current operating channel. The present invention further introduces a Scan indicator element to be used with the Quiet elements to mark which Quiet element is designated to scan and which Quiet element is used for legacy purposes (e.g. certain measurement purposes).

When an AP receives the scanning announcement (i.e. Quiet element and Scan indicator element) from $AP_i$, it will cache the packets that are destined to $AP_i$ in the designated period. But it can still communicate with other APs during the designated period.

When a STA (i.e. a standard 802.11 station) receives an off-channel announcement, it can not decipher Scan Indicator (since it is not a standardized message). But it will still understand the Quiet element. So it executes the Quiet element by keeping silent in the designated period. So during the scanning period, the proposed announcement can silence the local STAs but allow the communication that does not involve $AP_i$ continues in the rest of mesh network.

In other words, the present invention provides a method of making an on-channel announcement that a mesh access point (MAP) will be temporarily unavailable. The announcement is made using a combination of information elements that are included in a beacon. The first information element quiets stations associated with the mesh access point, as described in clause 11.9.2 of IEEE 802.11-2007. (For this and any IEEE standards recited herein, see: http://standards.ieee.org/getieee802/index.html or contact the IEEE at IEEE, 445 Hoes Lane, PO Box 1331, Piscataway, N.J. 08855-1331, USA.) The second information element instructs neighboring mesh points to temporarily suspend transmissions to the MAP at the same time the stations are quieted.

FIG. 1 illustrates a communication network 100 in accordance with some embodiments of the present invention. The communication network 100, for example, can be a mesh enabled architecture (MEA) network or an 802.11 network (i.e. 802.11a, 802.11b, 802.11g, or 802.11s). It will be appreciated by those of ordinary skill in the art that the communication network 100 in accordance with the present invention can alternatively comprise any packetized communication network where packets are forwarded across multiple wireless hops. For example, the communication network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop.

As illustrated, the communication network 100 comprises at least one intelligent access point (IAP) 105, a plurality of access points (AP) 110-N (referred to also as routers, nodes, or communication devices) for routing data packets between other nodes, and a plurality of subscriber stations (SS) 115-N (referred to also as mesh points, nodes, mobile nodes, or communication devices).

For example purposes, as illustrated in FIG. 1, stations 115-g. 115-h, and 115-i are associated with access points 110-A. Access Points 110-B, 110-C, 110-D, 110-E and 110-F are within one-hop range of AP 110-A. Three two-hop routes are shown in FIG. 1 (i.e. a route 120-1 between AP 110-D and IAP 105 via AP 110-C, a route 120-2 between AP 110-A and IAP 105 via AP 110-B, and a route 120-3 between AP 110-E and IAP 105 via AP 110-B).

In addition to providing data service to local stations, a mesh AP often needs to forward traffic for other APs. Hence, the traffic load on a mesh node might always be high. A mesh AP can schedule periodic scanning based on its own timing rather than the traffic load.

To form a mesh network, any AP must have at least one neighbor AP (i.e. an AP within one-hop range). In the existing periodic scanning policy, a CTS-to-self message is used to reserve the channel for the period of scanning. However, the CTS-to-self message is not suitable for a mesh network. For example, as shown FIG. 1, AP 110-B, 110-C, 110-D, 110-E and 110-F are within one-hop range of AP 110-A. When AP 110-A sends out a CTS-to-self to announce the scan period, stations 115-g through 115-i as well as AP 110-B through 110-F receive the message and stop their transmission. Therefore, all routes in the network including routes 120-1, 120-2, and 120-3 will not be available when AP 110-A is scanning. Hence, this invention provides a scan indicator element, which is used with Quiet element (defined in 802.11h) in the beacon, to announce the scanning-related absence time.

Before switching off from the current channel and executing a scan, the AP needs to announce its off-channel time (i.e. announcing its absence for a certain period of time) to other APs and STAs. Because the AP schedules periodic scanning based on its own timing, it can make off-channel announcement in the beacons. Here, the present invention utilizes the Quiet element in the beacon. The Quiet element is a beacon element, which is defined to silence the current channel.

However, the purpose of the off-channel announcement is not simply to quiet the entire channel. The off-channel announcement is meant to declare the future absence of an AP so that other APs will not transmit data to the AP in the designated period. To correctly express the off-channel announcement, a Scan Indicator element is included in the beacon.

Figure 2:
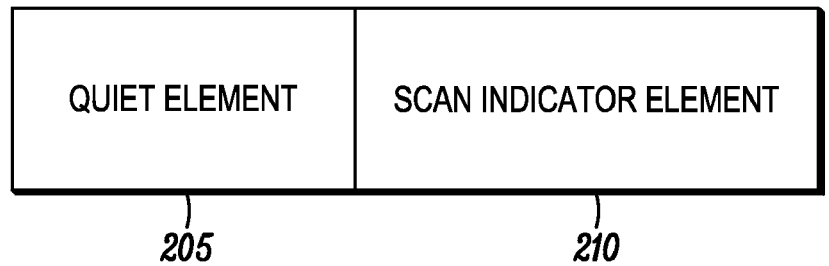
FIG. 2 illustrates a message format for operation of the network of FIG. 1 in accordance with some embodiments.

FIG. 2 illustrates the format of the mesh off-channel announcement 200 in accordance with some embodiments. As illustrated, the mesh off-channel announcement 200 comprises a beacon frame body include a quiet element 205 that describes the future absent period and a Scan Indicator 210 that indicates the purpose of channel absence is due to the scan so that other APs can react properly. In one embodiment, the quiet element 205 is present only in a QAP (quality of service access point) and if dot1RadioEnabled is true.

Figure 3:
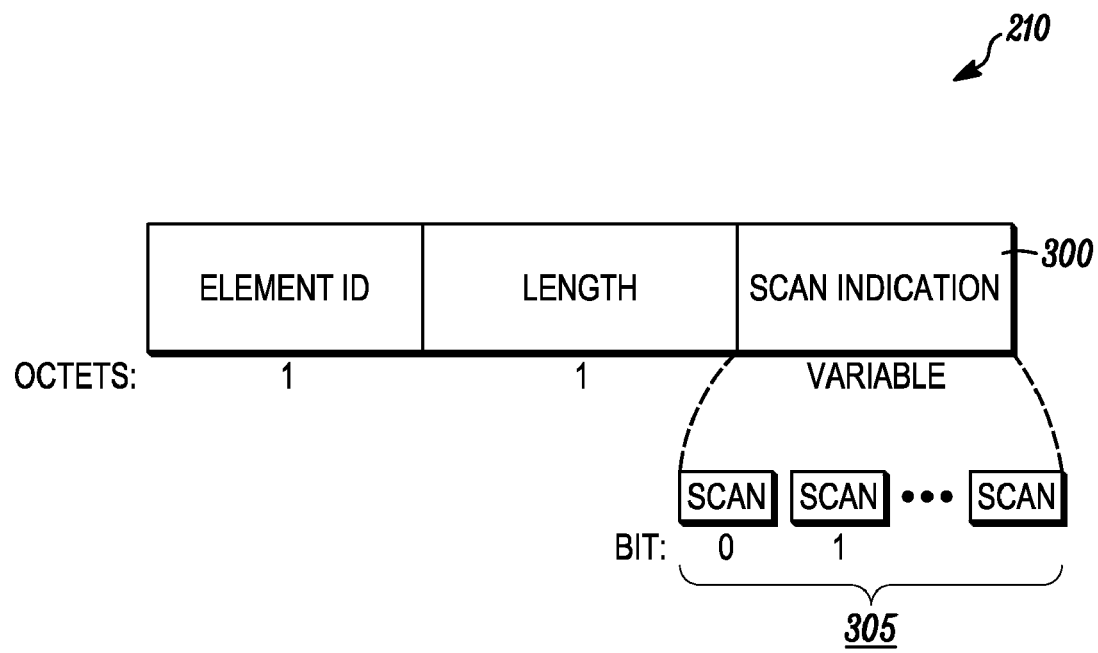
FIG. 3 illustrates further detail of the message format of FIG. 2 in accordance with some embodiments

FIG. 3 illustrates further detail of the format for the Scan Indicator Element 210 in accordance with some embodiments. Specifically, as illustrated, the Scan Indicator Element 210 includes a Scan Indication field 300, which comprises of a number scan bits 305. Each scan bit 305 corresponds to a quiet element since multiple quiet elements can be defined in the beacon. If a scan bit 305 is set to 1, the corresponding quiet element is used to depict the channel absence time due to the periodic scanning. If a scan bit is set to 0, the corresponding quiet element is used for other purposes.

When a mesh AP receives an off-channel announcement (i.e. Quiet element with corresponding scan indication bit set to 1) from $AP_i$, it will stop sending data to $AP_i$ in the designated period, while continuing to communicate with other APs during the designated period.

When a station (i.e. a standard 802.11 station) receives an off-channel announcement, it can not decipher Scan Indicator (since it is not a standardized message) but will still understand the Quiet element. In this case, the station will react to the Quiet element by keeping silence in the designated period. Since the stations that receive the off-channel announcement are associated with the AP that owns the announcement, such reaction still serves the purpose (When an AP takes time off the current channel, its associated stations are not able to engage in any communication).

Figure 4:
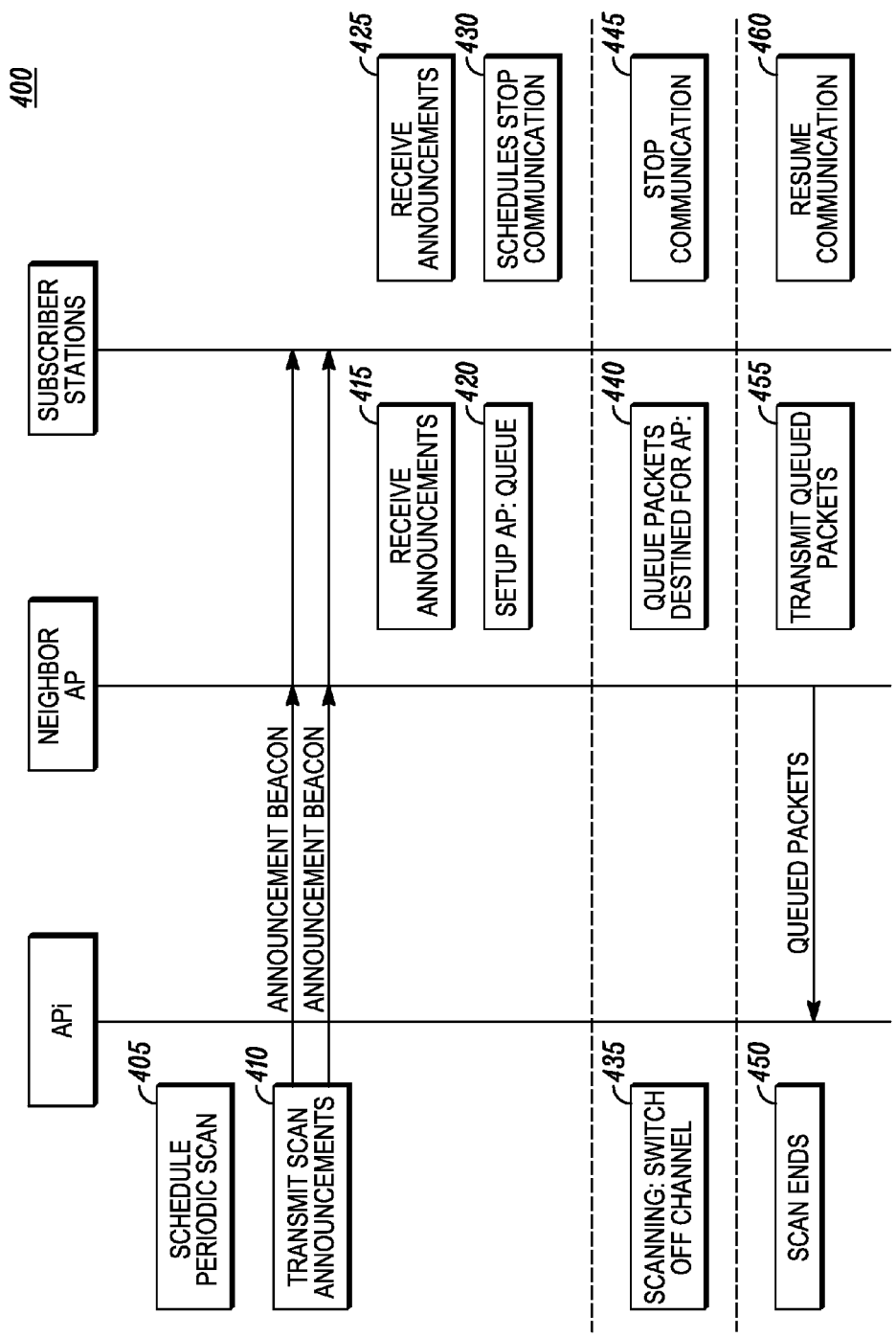
FIG. 4 is a flowchart and message flow diagram of a method for enabling periodic scanning in a mesh network in accordance with some embodiments.

FIG. 4 is a flowchart and message flow diagram of a method for enabling periodic scanning in a mesh network in accordance with some embodiments. As illustrated, the method begins within the first access point with Step 405 in which a first access point (i.e. $AP_i$) schedules a periodic scanning based on its own timing. Next, in Step 410, the first access point announces each scan in at least two consecutive beacons. Within each neighboring AP, beginning with Step 415, the neighbor AP receives the off-channel announcements in the beacons. Next, in Step 420, each neighbor AP sets up a queue for the $AP_i$ that sent the off-channel announcement. Each associated station, thereafter in Step 425, receives the announcement either directly from the first access point or indirectly from one or more of the neighboring access points. Next, in Step 430, each associated station schedules to stop communication during the designated period. Next, in Step 435, the first access point executes the scan. For example, the first access point finishes transmitting or receiving the current packet and switches off the channel. In Step 440, each neighbor AP queues the packets whose destination is $AP_i$ (because the scan window is small, it is not necessary to set up temporary route for $AP_i$). In Step 445, each associated station stops communication. After a given time, the scanning will end in Step 450. After scanning, in Step 455, each neighbor AP sends the queued packets to $AP_i$. In Step 460, the associated stations resume communications.

By way of example, the method of FIG. 4 can be applied to the communication network 100 of FIG. 1. For example, AP 110-A schedules a periodic scanning process. AP 110-A sends out off-channel announcements in the beacons. Stations 115-g through 115-i as well as APs 110-B through 110-F receive the announcements. Hence, during the scan, stations 115-g through 115-i stop transmissions. APs 110-B through 110-F stop transmitting data to AP 110-A but can communicate with each other. Therefore, route 120-1 and 120-3 are still available during the scan. Besides, AP 110-B can still transmit to IAP 105. Comparing with existing method, which applies CTS-to-self, the proposed mechanism minimizes the service interruption of mesh networks.

Figure 5:
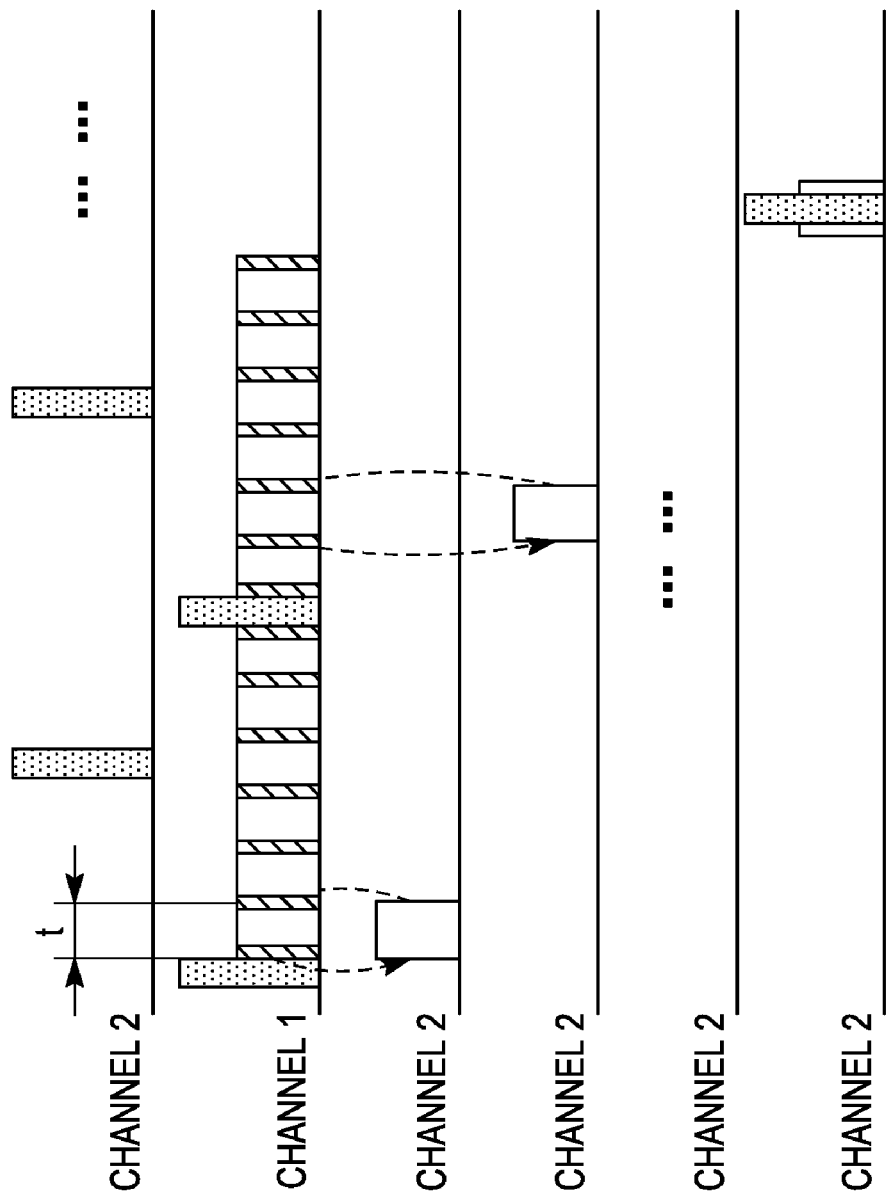
FIG. 5 illustrates an example of periodic scanning in accordance with some embodiments.
Figure 6:
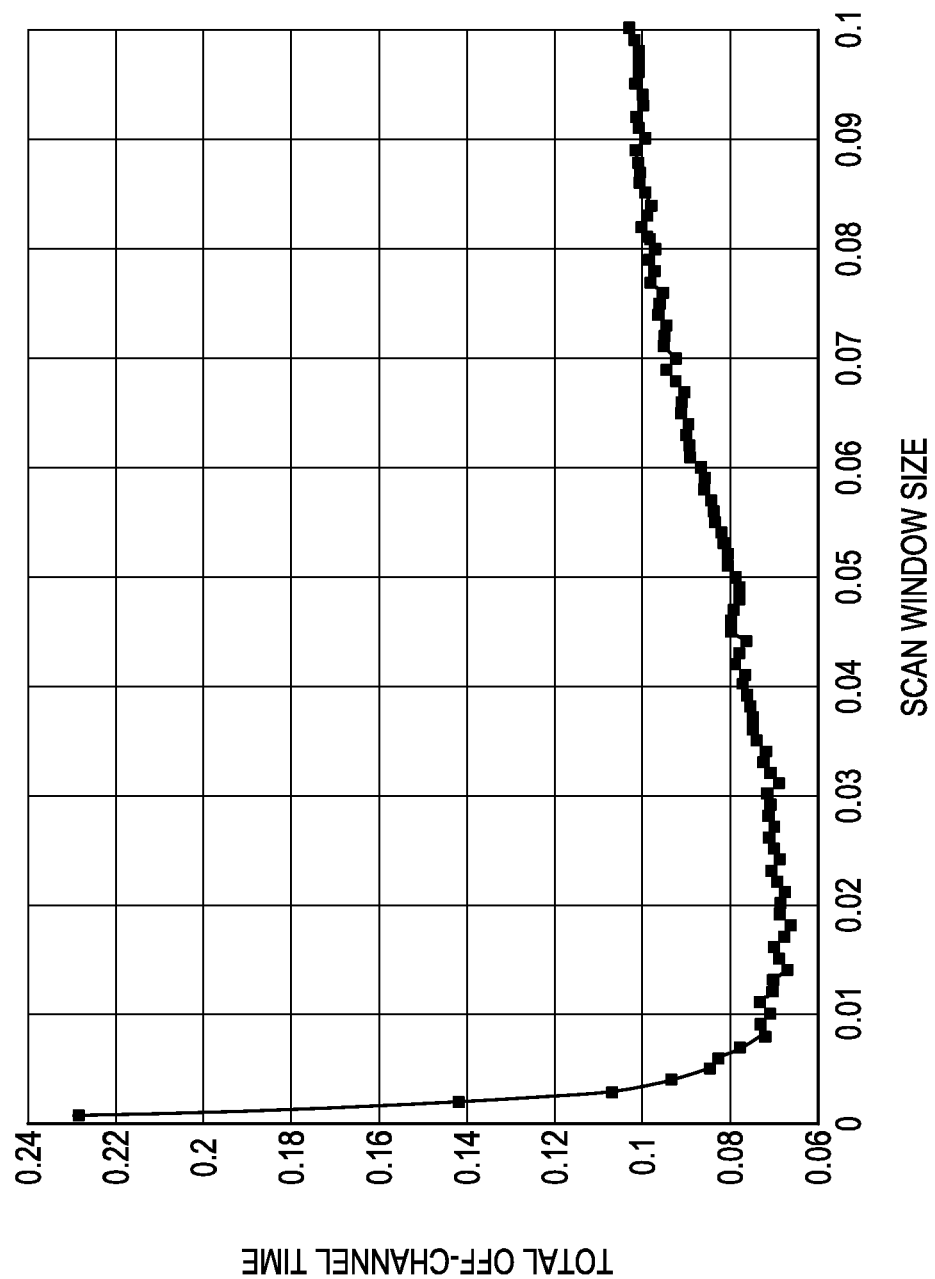
FIG. 6 illustrates an example of determining a scan window size in accordance with some embodiments.

An example of periodic scanning is shown in FIG. 5. A scan can be scheduled for n beacon periods (n≧1, for example, FIG. 5 shows the case of n=1). The multiple scan windows should cover a beacon period. The scan window should include a margin. The margin is at least the channel switch time plus the beacon transmission time. The scan window size is by default 10 milliseconds (ms), which is determined based on FIG. 6. FIG. 6 shows the total off-channel time an AP takes to capture a beacon versus the scan window size. We can see an optimum is achieved around scan window=10 ms.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling periodic scanning in a mesh network, the method comprising:
    transmitting from a first access point an announcement that it will be temporarily unavailable, wherein the announcement includes:

a first information element for quieting a station associated with the access point during a time period, wherein the first information element comprises a Quiet Element; and a second information element for instructing a neighboring access point to temporarily suspend transmissions to the access point during the time period that the stations are quieted, wherein the second information element comprises a scan indicator element.

2. The method of claim 1, wherein the announcement comprises an off-channel announcement.

3. A method for enabling periodic scanning in a mesh network, the method comprising:

communicating a scan announcement including a time period from the first access point to one or more neighbor access points and one or more associated stations, wherein the scan announcement comprises:

a first information element comprising a Quiet Element for quieting the associated stations during the time period; and a second information element comprising a scan indicator element for instructing the neighboring in access points to temporarily suspend transmissions to the access point during the time period that the stations are quieted;

during the time period:

executing the scan by the access point;

queuing one or more packets destined for the access point by each of the neighbor access points; and stopping communication by each of the associated stations.

4. The method of claim 3, further comprising after the time period:

sending the queued packets from each of the neighbor access points to the access point; and resuming communications by the associated stations.

5. The method of claim 3, further comprising in response to receiving the scan announcement and prior to the time period:

setting up a queue for the access point within each of the neighbor access points; and scheduling a stop communication during the time period within each associated station.

6. The method of claim 3, further comprising prior to sending the scan announcement:

scheduling a periodic scan during the time period by the access point using an internal timing of the access point.

7. The method of claim 3, wherein the scan announcement comprises an off-channel announcement.

* * * * *

UNITED STATES PATENT AND TRADEMARK OFFICE
CERTIFICATE OF CORRECTION

| | | |
|---|---|---|
| PATENT NO. | : 8,014,346 B2 | Page 1 of 1 |
| APPLICATION NO. | : 12/042492 | |
| DATED | : September 6, 2011 | |
| INVENTOR(S) | : Chu et al. | |

It is certified that error appears in the above-identified patent and that said Letters Patent is hereby corrected as shown below:

On the Title page, Item (56), under "OTHER PUBLICATIONS", Lines 1-2, delete "PCT International Search Report with ............... 2009-16 pages.".

In Column 7, Line 22, in Claim 3, delete "neighboring in" and insert -- neighboring --, therefor.

Signed and Sealed this
Eighteenth Day of December, 2012

David J. Kappos
*Director of the United States Patent and Trademark Office*